(12) United States Patent
Adam

(10) Patent No.: US 10,566,806 B2
(45) Date of Patent: Feb. 18, 2020

(54) MULTI-DEVICE TABLETOP CHARGING STATION

(71) Applicant: Todd Adam, Houston, TX (US)

(72) Inventor: Todd Adam, Houston, TX (US)

( * ) Notice: Subject to any disclaimer, the term of this patent is extended or adjusted under 35 U.S.C. 154(b) by 0 days.

(21) Appl. No.: 15/806,712

(22) Filed: Nov. 8, 2017

(65) Prior Publication Data

US 2019/0140461 A1   May 9, 2019

(51) Int. Cl.
*H02J 7/00* (2006.01)

(52) U.S. Cl.
CPC .......... *H02J 7/0027* (2013.01); *H02J 7/0052* (2013.01); *H02J 2007/0062* (2013.01)

(58) Field of Classification Search
CPC ..................................................... H02J 7/0027
USPC .................................................. 320/107, 114
See application file for complete search history.

(56) References Cited

U.S. PATENT DOCUMENTS

| 7,168,538 | B2 * | 1/2007 | Pena ...................... | H01R 13/72 191/12.2 R |
| 9,966,771 | B2 * | 5/2018 | Cross .................... | H02J 7/0063 |
| 2005/0046385 | A1 * | 3/2005 | Chung ................. | H01M 10/46 320/114 |
| 2006/0258195 | A1 * | 11/2006 | Schwartz ............... | A47B 21/06 439/131 |
| 2010/0171465 | A1 * | 7/2010 | Seal .................... | G03G 15/5004 320/114 |
| 2013/0320925 | A1 * | 12/2013 | Yu ......................... | H01R 13/72 320/111 |
| 2015/0263551 | A1 * | 9/2015 | Caren ................... | H02J 7/0045 455/569.1 |

* cited by examiner

*Primary Examiner* — Edward Tso
*Assistant Examiner* — Ahmed H Omar
(74) *Attorney, Agent, or Firm* — Spradley PLLC; Michael Spradley

(57) ABSTRACT

An improved multi-device tabletop charging station is described herein. The multi-device tabletop charging station can comprise a housing, a Universal Serial Bus (USB) hub, a plurality of retractable cable reels, and a plurality of chargers. The housing can comprise a top inner surface and a bottom inner surface. The top inner surface can enclose the bottom inner surface. The bottom inner surface can comprise a plurality of recessed sections, and a plurality of openings. The (USB) hub can be mounted within the top inner surface. The USB hub can comprise a plurality of powered ports. The plurality of retractable cable reels can each be mounted within each of the plurality of recessed section. The plurality of chargers can each be reeled onto each of the plurality of retractable cable reels. Each of the plurality of chargers can comprise a first end and a second end.

9 Claims, 6 Drawing Sheets

MULTI-DEVICE TABLETOP CHARGING STATION

BACKGROUND

This disclosure relates to an improved multi-device tabletop charging station.

Today, every household may own more than one mobile device such as cell phones, tablets, and portable game devices. Most of the time these devices requires charging all at the same time, which can be a problem especially when there are limited power supply outlet. Moreover, having mobile devices plugged in to different power supply outlet can look cluttered and unsightly. There are some charging stations that allow docking of devices to charge it. Such charging stations can look sleek and organized however, limits the user from moving and using the device while charging. As such it would be useful to have an improved multi-device tabletop charging station.

SUMMARY

An improved multi-device tabletop charging station is described herein. The multi-device tabletop charging station can comprise a housing, a Universal Serial Bus (USB) hub, a plurality of retractable cable reels, and a plurality of chargers. The housing can comprise a top inner surface and a bottom inner surface. The top inner surface can enclose the bottom inner surface. The bottom inner surface can comprise a plurality of recessed sections, and a plurality of openings. The (USB) hub can be mounted within the top inner surface. The USB hub can comprise a plurality of powered ports. The plurality of retractable cable reels can each be mounted within each of the plurality of recessed section. The plurality of chargers can each be reeled onto each of the plurality of retractable cable reels. Each of the plurality of chargers can comprise a first end and a second end. The first end of each of the chargers can be connectable to each of the powered ports. The second end of each of the chargers can be positioned within the openings.

DETAILED DESCRIPTION

Described herein is improved multi-device tabletop charging station. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
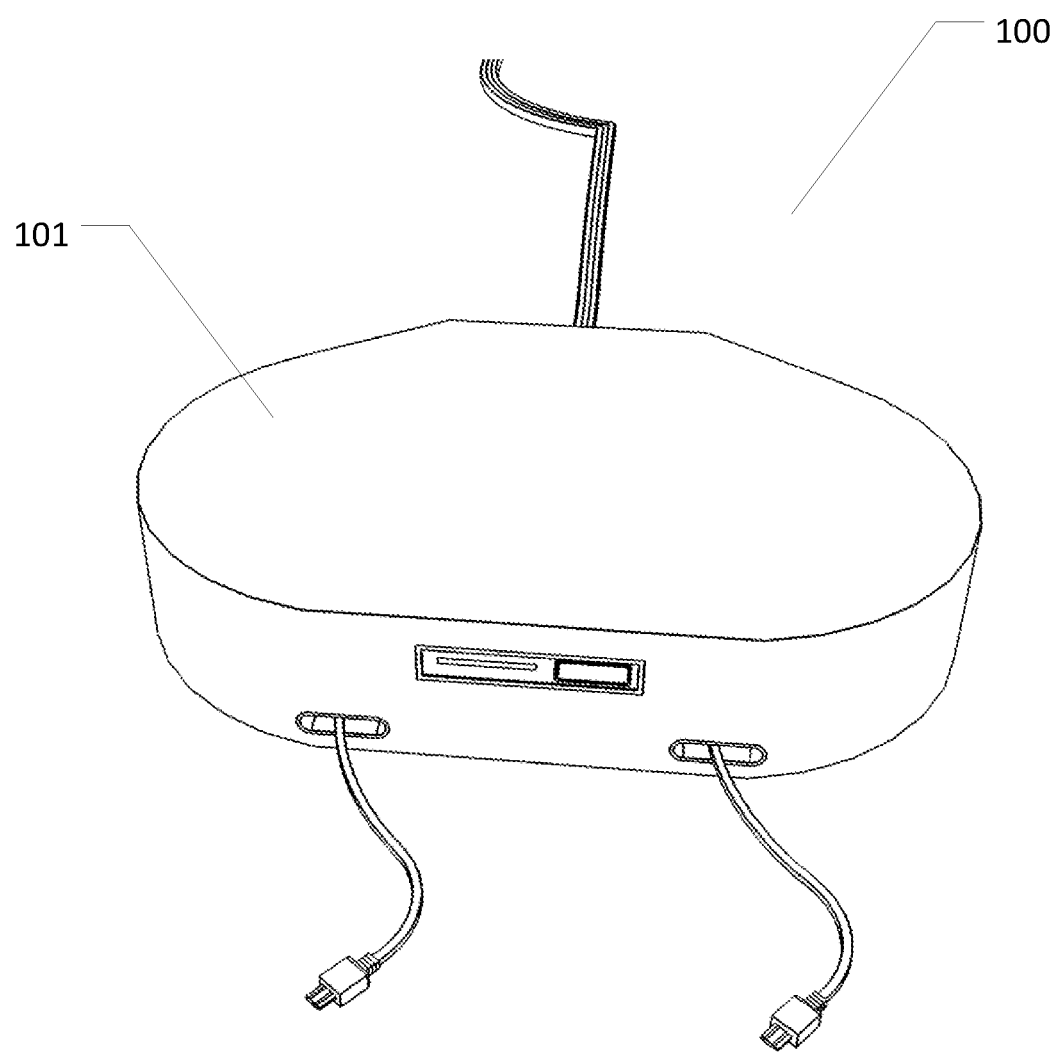
FIG. 1 illustrates a charging station comprising a housing.

FIG. 1 illustrates a charging station 100 comprising a housing 101. An example of charging station 100 can be a multi-device desk charging station. Housing 100 can protect and accommodate internal parts of charging station 100, such as charger cables, and power supply.

Figure 2:
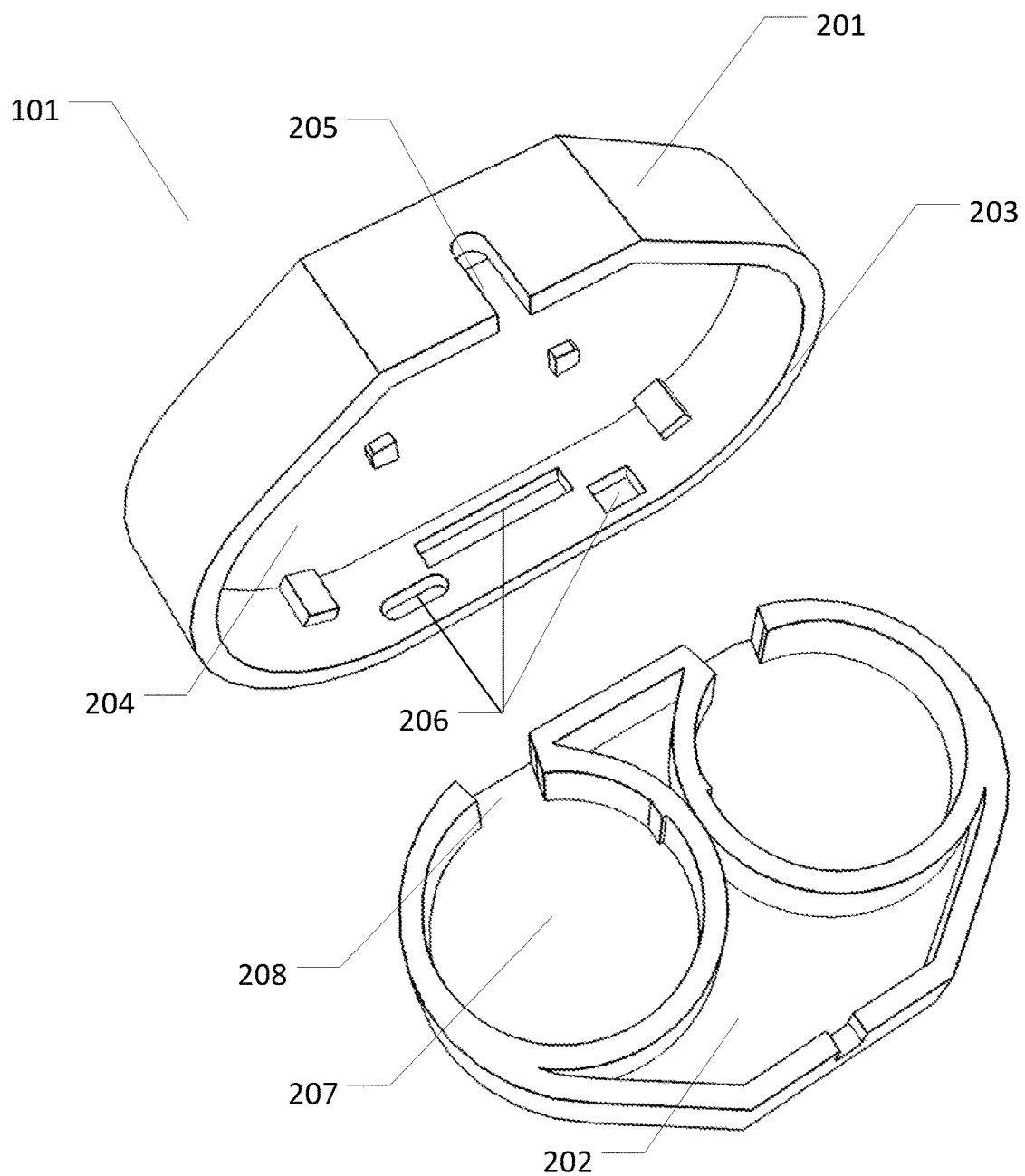
FIG. 2 illustrates an internal view of a housing comprising a top inner surface, and a bottom inner surface.

FIG. 2 illustrates an internal view of housing 101 comprising a top inner surface 201, and a bottom inner surface 202. Top inner surface 201 can comprise a rim 203, a depressed portion 204, a slit 205, and a plurality of orifices 206. Rim 203 can be a border placed around the outer edge of top inner surface 201. Rim 203 can protrude from top inner surface 201, which produces a depressed portion 204. Depressed portion 204 can be a shallow area that is bordered by rim 203. Depressed portion 204 can be capable of storing one or more objects. Slit 205 can be an opening placed at one side of rim 203. Orifices 206 can be holes that are placed within the other side of rim 203. Bottom inner surface 202 can comprise a plurality of cylindrical recessed sections 207. Each recessed section 207 can be placed within the middle section of bottom inner surface 202. The outer side portion of each recessed section 207 can comprise an opening 208. In such structure, opening 208 can be a gap within recessed section 207 that can be accessible from the outer section of bottom inner surface 202.

Figure 3:
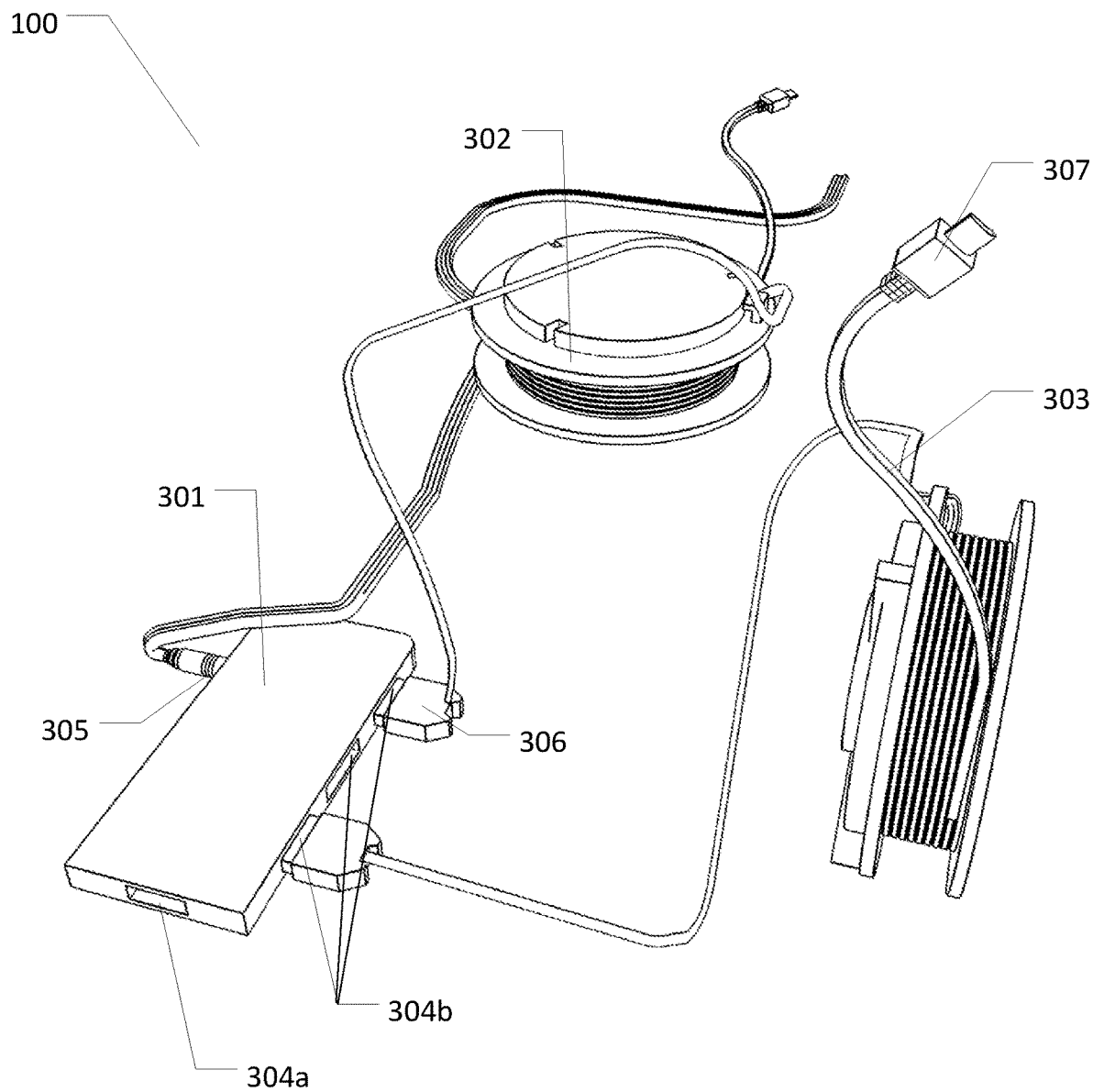
FIG. 3 illustrates internal components of a charging station.

FIG. 3 illustrates internal components of charging station 100. Internal components of charging station 100 can comprise a self powered Universal Serial Bus (USB) hub 301, a plurality of cord reels 302, and a plurality of charger cables 303. USB hub 301 can comprise a plurality of ports 304 and a power adapter 305. In this embodiment, a single port 304a can be placed at one side of USB hub 301, while a plurality of ports 304b can be placed on another side of USB hub 301. USB hub 301 can be capable of providing power to ports 304 through connecting power adapter 305 to a power supply. In one embodiment, USB hub 301 can be a USB 2.0 powered hub. In another embodiment, USB hub 301 can be a USB 3.0 powered hub. Cord reels 302 can be retractable cord reels that are capable of extending and retracting cords, and/or cables. Each charger cable 303 can comprise a first end 306 and a second end 307. In one embodiment, first end 306 of each charger cable 303 can be a standard USB cable connector. Second end 307 of each charger cable 303 can be different type of connectors, which can include but is not limited to USB connector, micro-USB connector, mini-USB B plug, and/or lightning connector. Further, each charger cable 303 can be winded within each cord reel 302. First end 306 can be connected to each port 304 of USB hub 301.

Figure 4:
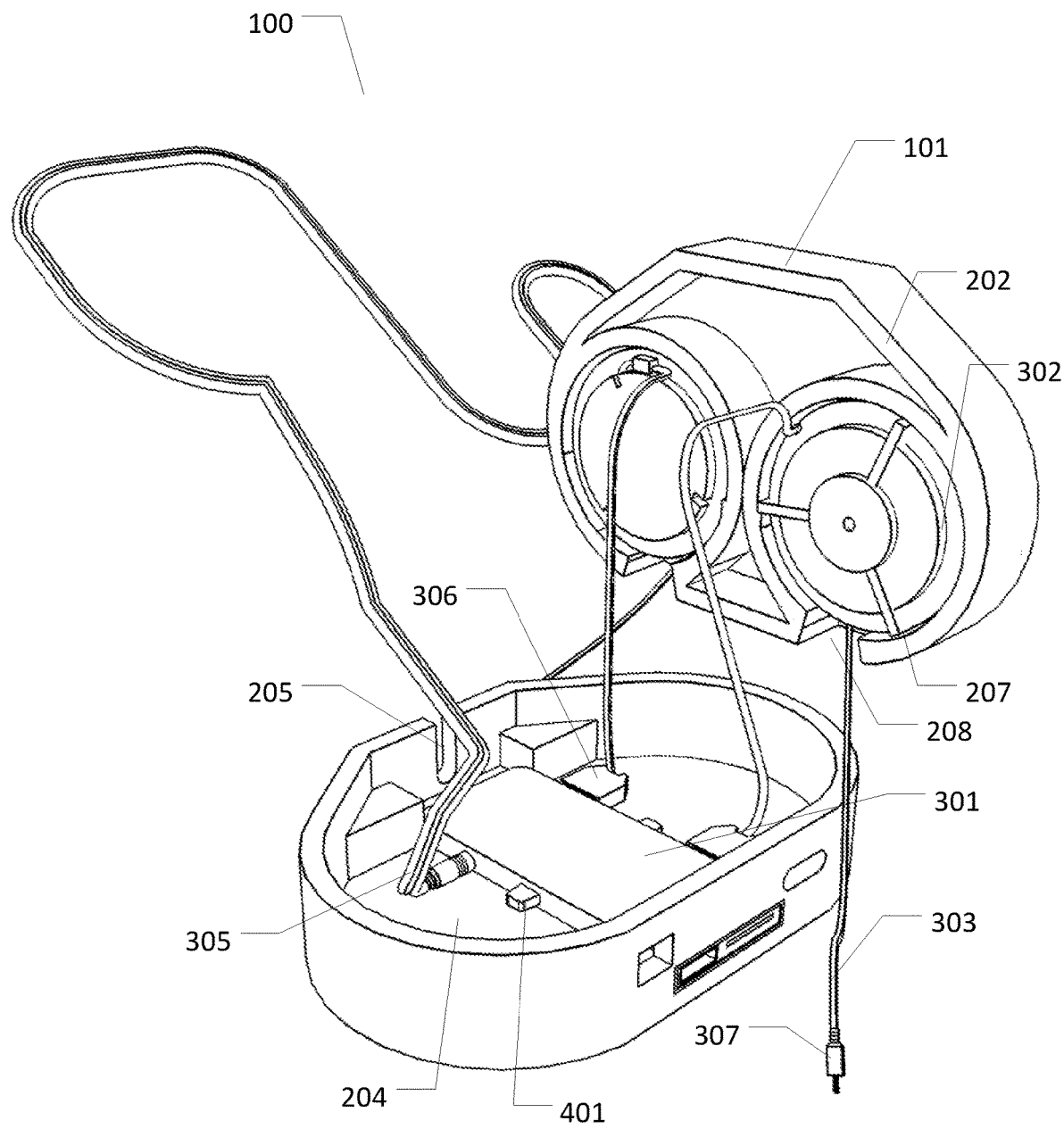
FIG. 4 illustrates internal components of a charging station mounted within a housing.

FIG. 4 illustrates internal components of charging station 100 mounted within housing 101. USB hub 301 can be attached within depressed portion 204 of top inner surface 201. In one embodiment, depressed portion 204 can further comprise a holder 401. Holder 401 can be capable of keeping USB hub 301 in place. In another embodiment, USB hub 301 can be attached within depressed portion 204 through various fastening, and/or adhesion method known in the art. The cord of power adapter 305 can be placed within slit 205. Further, each cord reel 302 mounted with each charger cable 303 can be placed within each recessed section 207 of bottom inner surface 202. Cord reels 302 can be mounted within recessed section 207 such that second end 307 of each charger cable 303 is positioned within opening 208.

Figure 5:
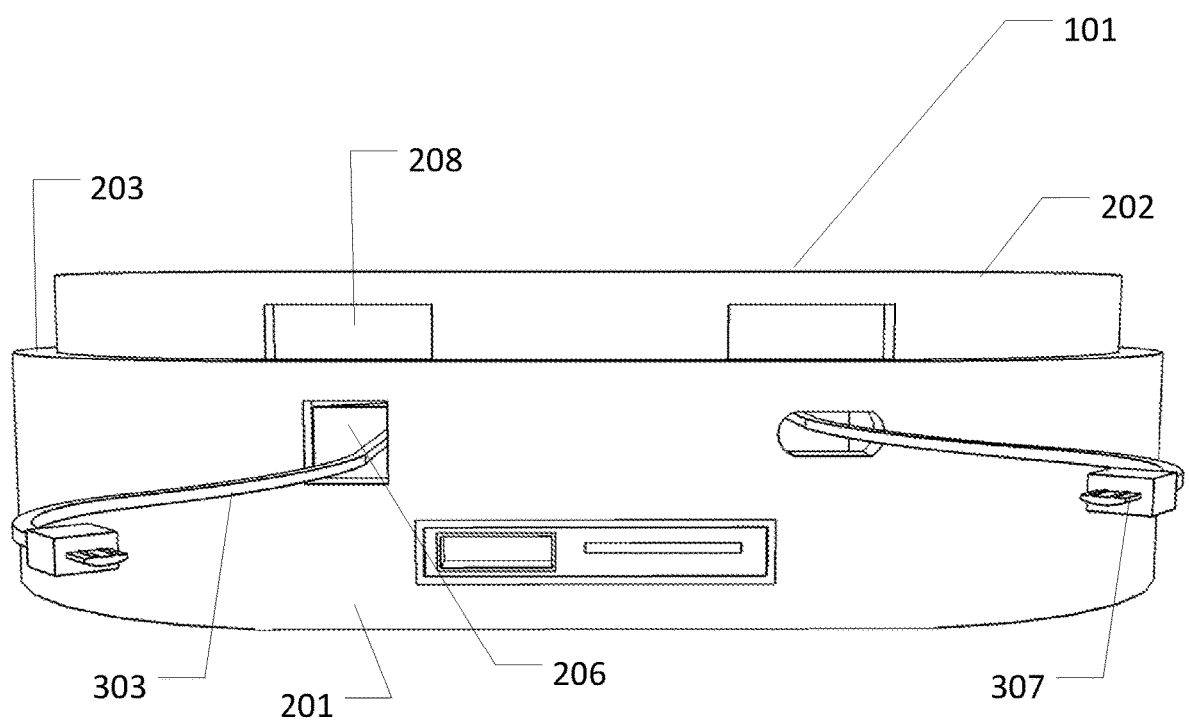
FIG. 5 illustrates a bottom inner surface being mounted within a depressed portion of a top inner surface.

FIG. 5 illustrates top inner surface 201 enclosing bottom inner surface 202. In this embodiment, bottom inner surface 202 can be compatible with top inner surface 201 such that bottom inner surface 202 can fit snugly within rim 203 of top inner surface 201. Moreover, orifices 206 of top inner surface 201 can be horizontally aligned with each opening 208 of bottom inner surface 202. In this embodiment, the side of USB hub 301 that comprises single USB port 304a can be positioned within one of the orifices 206 such that single USB port 304a is accessible from the outside portion of charging station 100. Furthermore, each second end 307 of charger cables 303 can go through the other orifices 206 and opening 208. Thus, each second end 307 of charger cables 303 can be accessible from the outside of housing 101.

Figure 6:
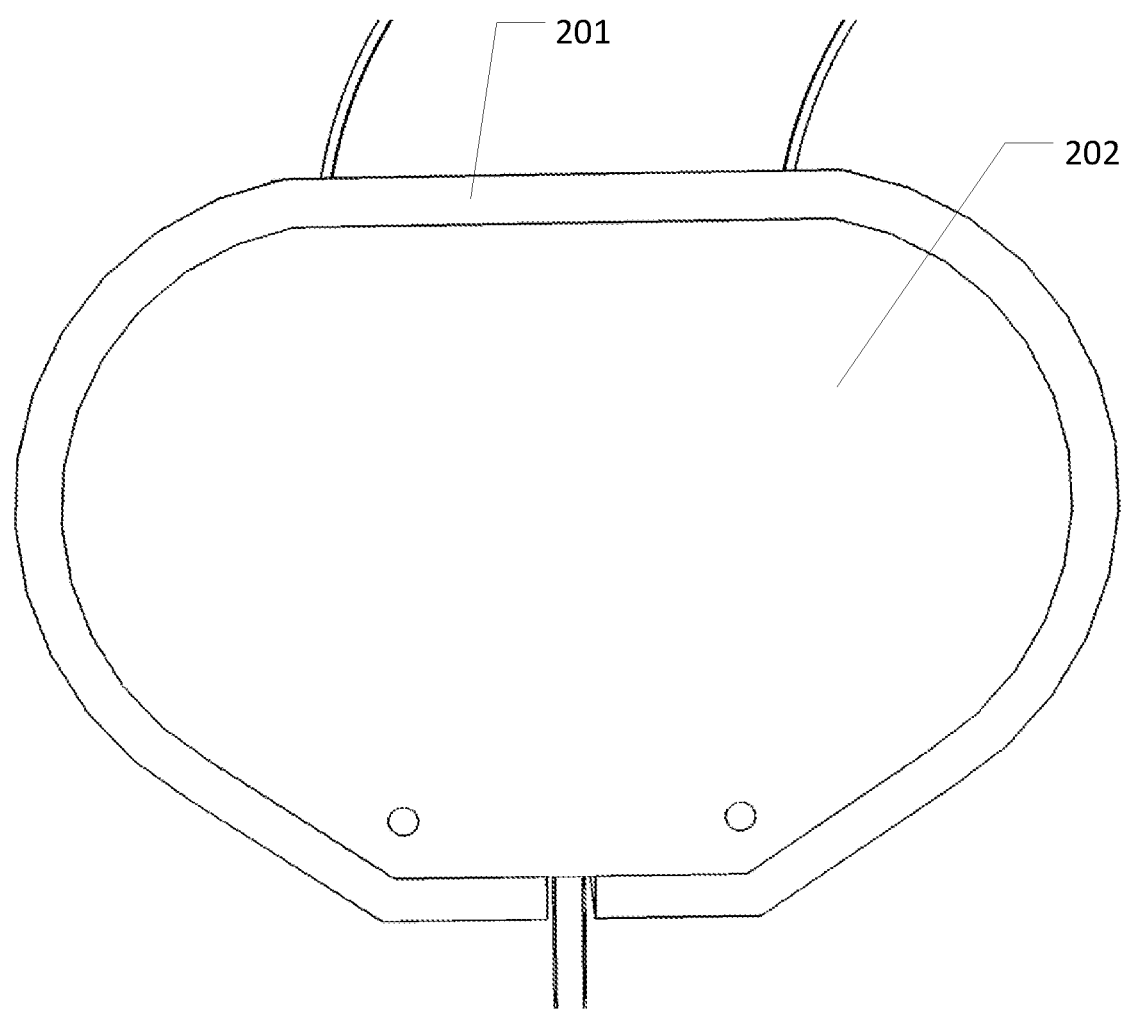
FIG. 6 illustrates a bottom inner surface attached within a top inner surface.

FIG. 6 illustrates bottom inner surface 202 attached within top inner surface 201. In one embodiment, bottom inner surface 202 can be attached within top inner surface 201 through methods that can include but is not limited to fastening, soldering, and adhesion.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A multi-device tabletop charging station comprising
a housing comprising
a top inner surface;
a bottom inner surface, said top inner surface capable of enclosing said bottom inner surface, further wherein said bottom inner surface comprising a plurality of recessed sections; and
a plurality of openings;
a Universal Serial Bus (USB) hub mounted within said top inner surface, further wherein said USB hub comprises a plurality of powered ports, a first powered port of said plurality of powered ports positioned at a first opening of said plurality of openings such that only said first powered port is accessible through said first opening from outside said housing;
a plurality of retractable cable reels each mounted within one of said plurality of recessed sections; and
a plurality of chargers each reeled onto each of said plurality of retractable cable reels, wherein each of said plurality of chargers comprising a first end and a second end, wherein said first end of each of said chargers is connected to one of a plurality of additional powered ports of said powered ports within said housing, further wherein said second end of each of said chargers pass through one of additional openings of said plurality of openings, said second ends accessible from outside said housing.

2. The multi-device tabletop charging station of claim 1 wherein said top inner surface further comprises a holder, wherein said holder keeps said USB hub in place.

3. The multi-device tabletop charging station of claim 1 wherein said USB hub is a self-powered hub.

4. The multi-device tabletop charging station of claim 1 wherein said USB hub a USB 2.0 powered hub.

5. The multi-device tabletop charging station of claim 1 wherein said USB hub is a USB 3.0 powered hub.

6. The multi-device tabletop charging station of claim 1 wherein said second end of one or more of said plurality of chargers comprises a USB connector.

7. The multi-device tabletop charging station of claim 1 wherein said second end of one or more of said plurality of chargers comprises a micro USB connector.

8. The multi-device tabletop charging station of claim 1 wherein said second end of one or more of said plurality of chargers comprises a mini USB B plug.

9. The multi-device tabletop charging station of claim 1 wherein said second end of one or more of said plurality of chargers comprises a lightning connector.

* * * * *